United States Patent
Hall et al.

(10) Patent No.: US 9,976,348 B2
(45) Date of Patent: May 22, 2018

(54) TIGHTLY-CLOSING DYNAMIC ASSEMBLY

(71) Applicant: David R. Hall, Provo, UT (US)

(72) Inventors: David R. Hall, Provo, UT (US); Jonathan Marshall, Springville, UT (US); Daniel Manwill, Spanish Fork, UT (US); Craig Boswell, Draper, UT (US); Scott Dahlgren, Alpine, UT (US); Scott Woolston, Spanish Fork, UT (US); Daniel Madsen, Vineyard, UT (US)

(*) Notice: Subject to any disclaimer, the term of this patent is extended or adjusted under 35 U.S.C. 154(b) by 1028 days.

(21) Appl. No.: 14/224,350

(22) Filed: Mar. 25, 2014

(65) Prior Publication Data
US 2015/0275582 A1    Oct. 1, 2015

Related U.S. Application Data

(60) Provisional application No. 61/805,006, filed on Mar. 25, 2013, provisional application No. 61/947,829, filed on Mar. 4, 2014.

(51) Int. Cl.
*E21B 4/00*    (2006.01)
*F16J 15/16*   (2006.01)

(52) U.S. Cl.
CPC .............. *E21B 4/003* (2013.01); *F16J 15/16* (2013.01)

(58) Field of Classification Search
CPC ........ E21B 27/005; E21B 43/02; E21B 37/08; E21B 43/08; E21B 37/082; E21B 37/084; E21B 37/086; E21B 37/088; E21B 37/003
See application file for complete search history.

(56) References Cited

U.S. PATENT DOCUMENTS

| | | | |
|---|---|---|---|
| 4,074,867 A | 2/1978 | Jacob | |
| 5,456,475 A | 10/1995 | Abraham | |
| 5,492,416 A | 2/1996 | Gabelli | |
| 7,559,361 B2 | 7/2009 | Obrejanu | |
| 8,006,982 B2 | 9/2011 | Whitlow | |
| 8,113,716 B2 | 2/2012 | Kikuchi | |
| 8,629,594 B2 | 1/2014 | Sugimoto | |
| 2011/0048810 A1 | 3/2011 | Lin et al. | |
| 2012/0139250 A1* | 6/2012 | Inman | E21B 21/10 290/52 |
| 2014/0265337 A1* | 9/2014 | Harding | F03B 7/00 290/52 |
| 2016/0332920 A1* | 11/2016 | Watanabe | C04B 41/4988 |

\* cited by examiner

*Primary Examiner* — Matthieu F Setliff
*Assistant Examiner* — Thomas L Neubauer
(74) *Attorney, Agent, or Firm* — Philip W. Townsend, III

(57) ABSTRACT

Downhole drilling often requires passing drilling fluid containing water mixed with mud through a downhole drill pipe. Such drill pipe may comprise cavities therein for working units such as motors, generators, solenoids and the like. It may be desirable to lubricate and cool such working units with water from the drilling fluid, however, mud particulate may damage such devices. The present invention comprises various embodiments of a dynamic seal assembly designed to allow fluid communication between a cavity and a fluid flow while blocking certain particulate matter within the fluid flow from entering the cavity. The fluid communication may occur through and the particulate matter may be blocked by a defined clearance between two complementary surfaces that are movable relative to each other.

14 Claims, 6 Drawing Sheets

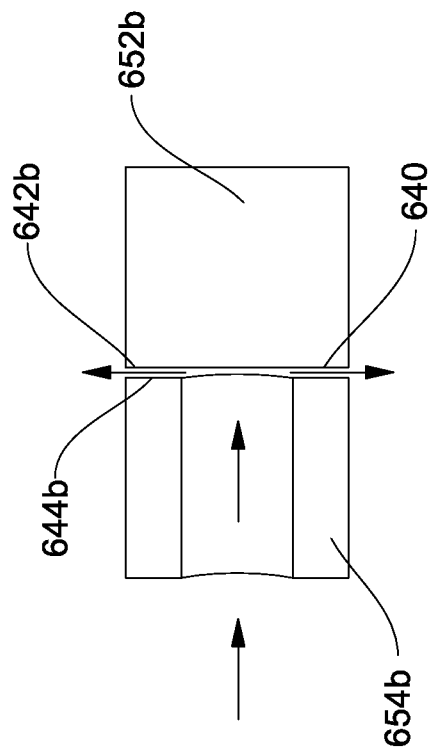
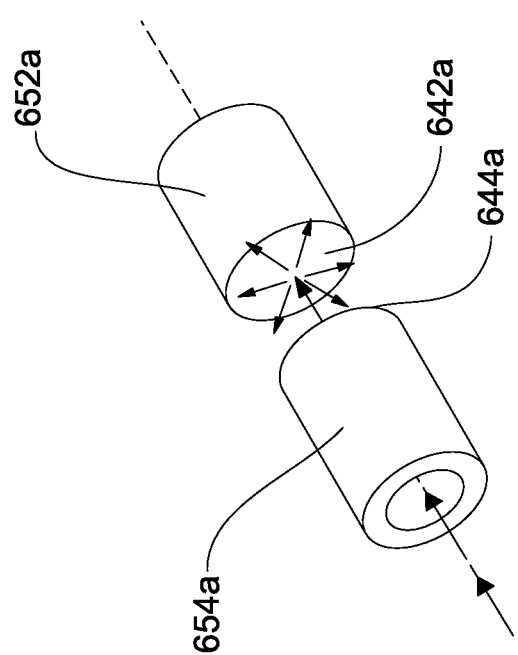

TIGHTLY-CLOSING DYNAMIC ASSEMBLY

CROSS REFERENCE TO RELATED APPLICATIONS

This patent application claims priority to U.S. Provisional Pat. App. Nos. 61/805,006, filed on Mar. 25, 2013, and 61/947,829, filed on Mar. 4, 2014, which are incorporated herein by reference for all that they contain.

BACKGROUND OF THE INVENTION

The present invention relates generally to seal assemblies that allow for fluid flow while blocking certain particulate matter. More particularly, the present invention relates to dynamic seal assemblies formed by a pair of opposing surfaces capable of moving relative to each other.

Various dynamic seals of varying blocking abilities are known in the art. For example, U.S. Pat. No. 8,006,982 to Whitlow et al., which is incorporated herein for all that it discloses, describes rotary shafts fitted with dynamic seals to prevent leakage of oil and other fluids between a shaft and an opening in an outer housing through which the shaft passes. Such dynamic seals have been provided in a wide array of configurations and formed from numerous different materials. In a common arrangement, a stationary ring is coupled with the housing and a rotating ring assembly is coupled with the shaft. The stationary ring and rotating ring are placed in sealing engagement with one another. A plurality of seals are positioned at several different locations, according to the configuration of the stationary and rotating rings, to prevent the passage of fluid or debris passed the stationary and rotating rings, either between the components themselves or the components and the shaft or housing. Commonly, these seals are comprised of an elastomeric material, chosen to provide adequate sealing engagement with the application of minimal pressure and expense. However, prior elastomeric seals for rotating equipment have been limited to relatively low maximum service temperatures. This has limited the use of common dynamic seal designs in particular applications that experience periodic to sustained temperatures in excess of the maximum service temperatures of conventional elastomeric/polymer materials. To overcome this problem, Whitlow et al. attempt to use metallic materials rather than elastomeric.

U.S. Pat. No. 8,629,594 to Sugimoto, which is incorporated herein for all that it discloses, discloses a lubrication structure of a generator motor, comprising at least two bearings rotatably supporting an input/output shaft of the generator motor, a gap provided between the two bearings, a cylindrical-shaped bearing attaching member attached to inner peripheral parts of the two bearings, and a through hole penetrating the bearing attaching member outward in a radial direction and opening in a position overlapping with the gap.

While using metallic materials and providing lubrication has helped, there is still a need for improved dynamic seals assemblies.

BRIEF SUMMARY OF THE INVENTION

The present invention comprises various embodiments of a dynamic seal assembly designed to allow fluid communication between a cavity and a fluid flow while blocking certain particulate matter within the fluid flow from entering the cavity. The fluid communication may occur through and the particulate matter may be blocked by a defined clearance between two complementary surfaces that are movable relative to each other.

In order to maintain a consistent defined clearance between surfaces moving relative to each other, especially in the presence of abrasive particulate matter, it may be desirable to form the two complementary surfaces out of super-hard heat-resistant materials such as polycrystalline diamond. It may also be desirable to provide the complementary surfaces with machined finishes. Such materials and processing may allow for the defined clearance between the two complementary surfaces to be less than 0.003 inches (0.0762 mm). Super-hard heat-resistant materials may also allow movement of the two complementary surfaces relative to each other to crush particulate matter within the defined clearance.

In certain embodiments of the present invention, the two complementary surfaces may each be tubular and concentric such as where an external surface of a first substantially cylindrical component meets an internal surface of a second substantially toroidal component. In such embodiments, the first substantially cylindrical component may be axially rotatable and/or axially translatable relative to the second substantially toroidal component. Where axially rotatable, a motor or generator may be disposed within the cavity comprising a stator and a rotor rigidly connected to one or the other of the first substantially cylindrical component and second substantially toroidal component. A rotatable turbine may be disposed within the fluid flow and rigidly connected to either the first substantially cylindrical component or second substantially toroidal component to rotate the same.

Where axially translatable, a solenoid switch may be disposed within the cavity comprising a helical winding and an armature rigidly connected to one or the other of the first substantially cylindrical component and second substantially toroidal component.

In either case, at least one perforation may be disposed within the second substantially toroidal component repetitively sealable by rotation or translation of the first substantially cylindrical component to create a valve. Additionally, the first substantially cylindrical component may comprise a conduit there through to allow for at least a portion of the fluid flow to pass through. This may be desirable to pressure balance a valve or other device.

In various embodiments, the two complementary surfaces may each be planar and adjacent. Or, a second defined clearance may be disposed between a second set of complementary surfaces allowing for further fluid communication between the cavity and the fluid flow while continuing to block certain particulate matter from entering the cavity.

It is believed that such configurations of the present invention may be useful for cavities formed in downhole drill pipes to allow for water within drilling fluid to lubricate and cool the contents of the cavity without allowing mud particulates within the drilling fluid to damage the contents.

BRIEF DESCRIPTION OF THE DRAWINGS

FIGS. 6a and 6b are perspective and longitudinal section views respectively of an embodiment of a first substantially cylindrical component and a second substantially toroidal component forming two complementary surfaces that are planar and adjacent.

DETAILED DESCRIPTION OF THE INVENTION

Figure 1:
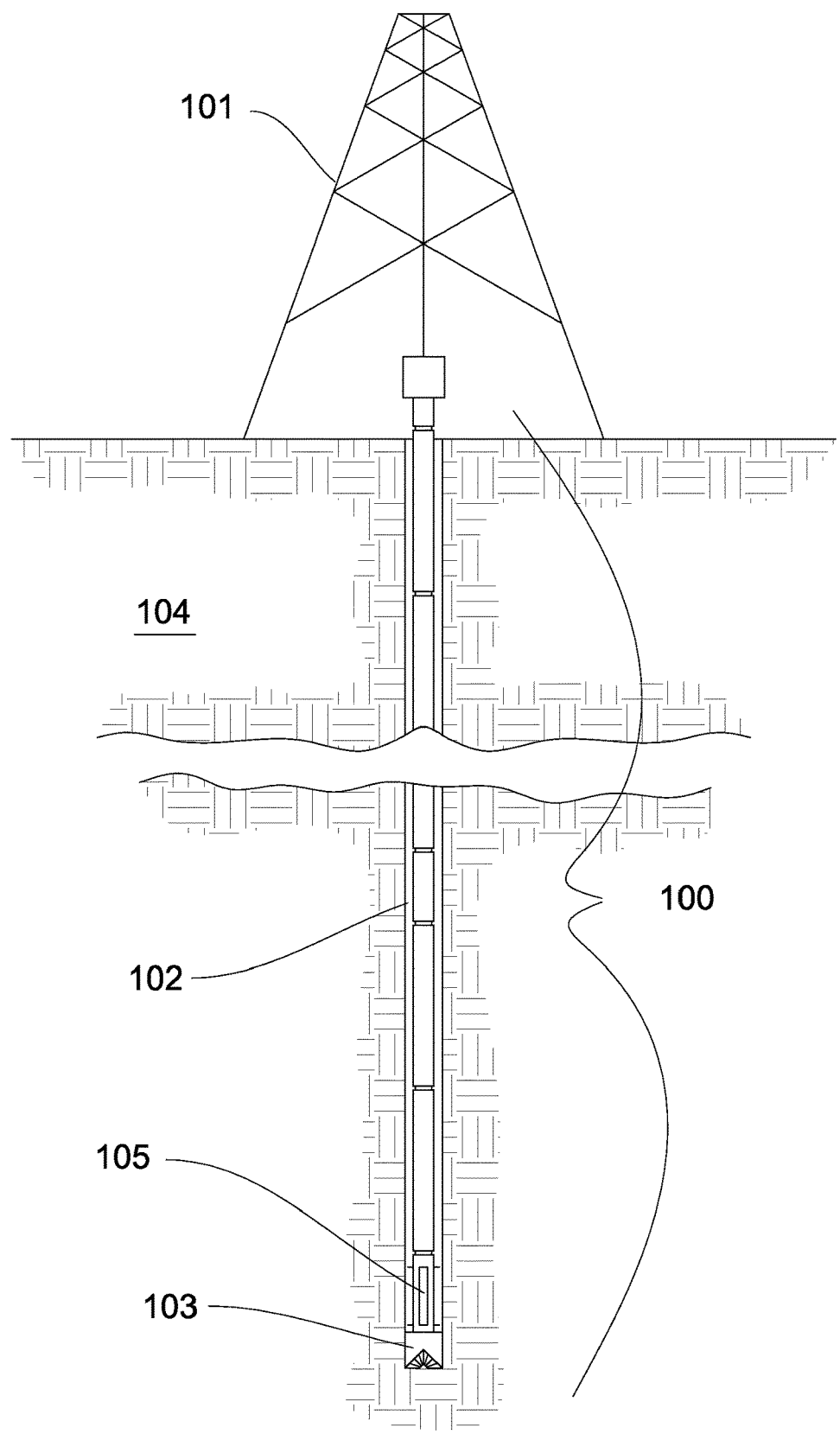
FIG. 1 is a cutaway side view of an embodiment of a downhole drilling operation.

Referring now to the figures, FIG. 1 shows an embodiment of a downhole drilling operation comprising a downhole drill string 100 suspended by a derrick 101 in a borehole 102. A drill bit 103 may be located at the bottom of the borehole 102. As the drill bit 103 rotates the downhole tool string 100 may advance into an earthen formation 104. The downhole tool string 100 may comprise various mechanical and/or electrical equipment 105 able to perform various functions. To aid in downhole drilling, drilling fluid comprising water or other fluids mixed with mud may be passed through the downhole drill string 100 and past the mechanical and/or electrical equipment 105. While the water or fluid may be beneficial in lubricating and cooling the mechanical and/or electrical equipment 105, particulate from the mud can easily cause damage.

Figure 2:
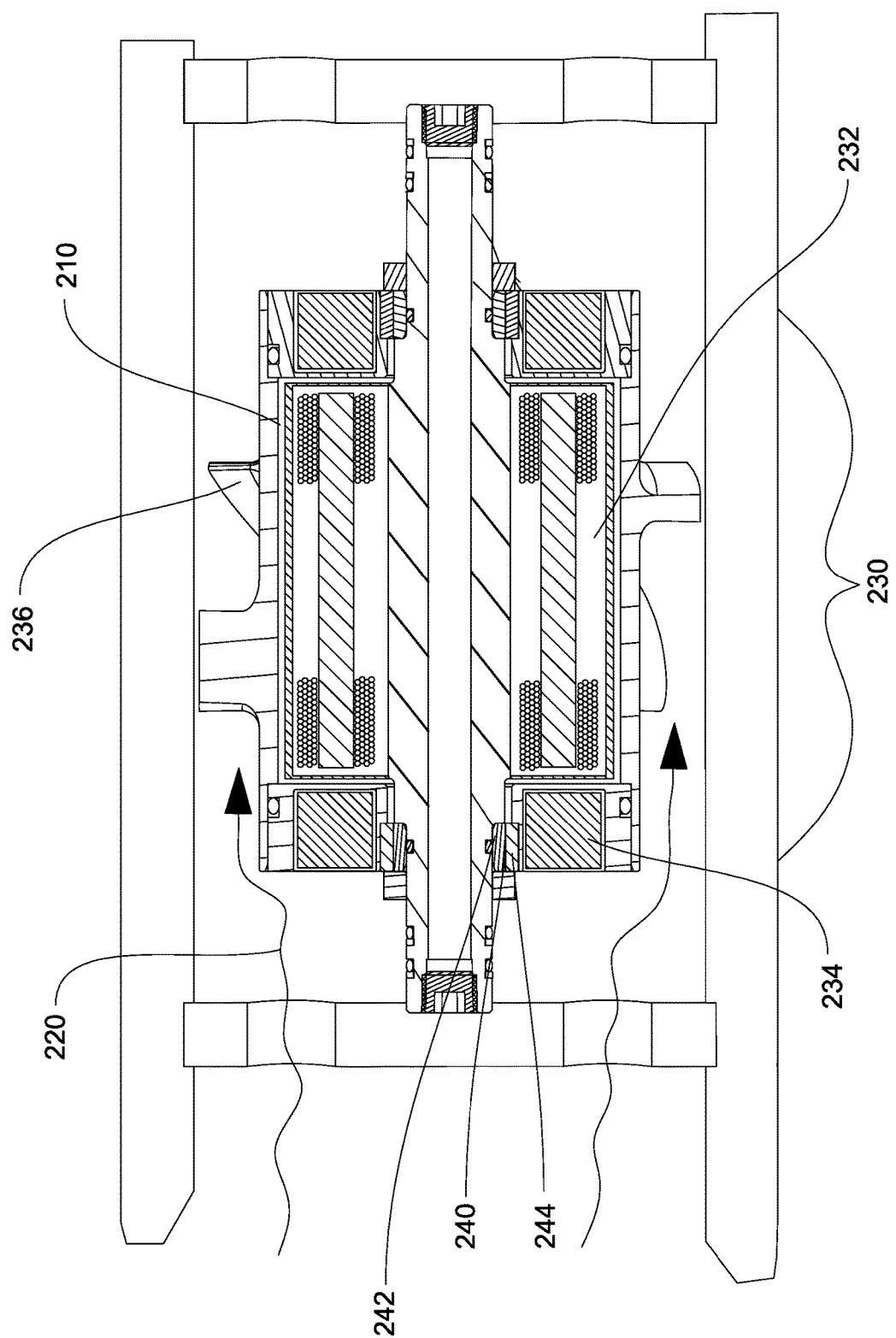
FIG. 2 is a longitudinal section view of an embodiment of a cavity disposed adjacent a fluid flow.

To protect mechanical and/or electrical equipment from certain particulate matter while still allowing for fluid flow, a cavity 210, as shown in FIG. 2, may be disposed adjacent a fluid flow 220. In the embodiment shown in FIG. 2, the cavity 210 comprises a motor or generator 230 disposed therein, however, other mechanical and/or electrical equipment is anticipated. A defined clearance 240 between first and second complementary surfaces 242, 244 may allow for fluid communication between the fluid flow 220 and the cavity 210. This defined clearance 240 may allow fluid to enter the cavity 210 while blocking potentially harmful particulate.

In the embodiment shown, a stator 232 of the motor or generator 230 is rigidly connected to the first complementary surface 242 and a rotor 234 of the motor or generator 230 is rigidly connected to the second complementary surface 244. However, in other embodiments this may be reversed. A turbine 236 may also be attached to the rotor 234 and exposed to the fluid flow 220 causing the turbine 236 to rotate the rotor 234. Thus, the first and second complementary surfaces 242, 244 may block certain particulate from entering the cavity 210 while they are moving relative to each other. Additionally, the relative movement may act to crush any particulate matter within the defined clearance 240 before it has an opportunity to do harm.

Figure 3:
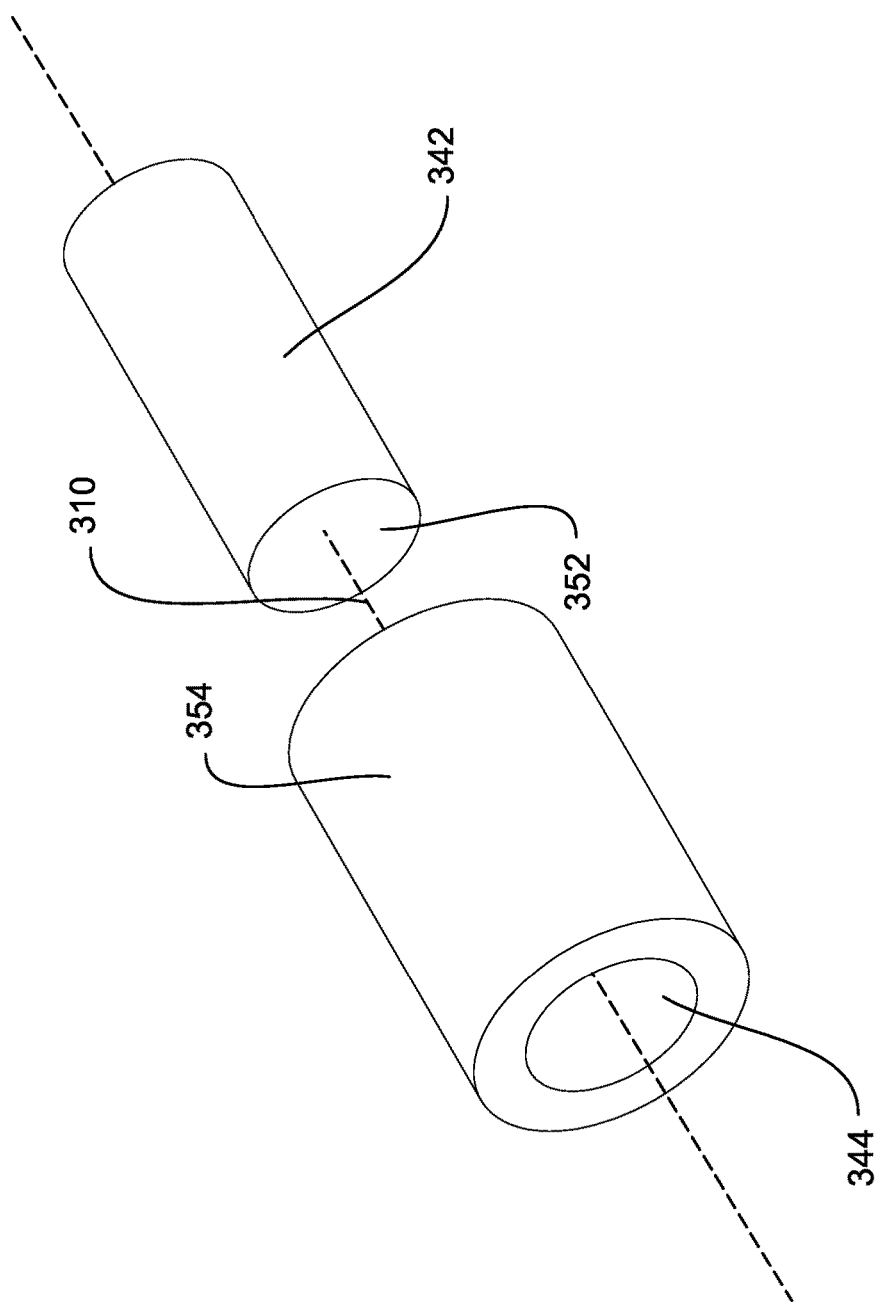
FIG. 3 is a perspective view of an embodiment of tubular and concentric complementary surfaces disposed on a first substantially cylindrical component and a second substantially toroidal component respectively.

FIG. 3 shows one embodiment of how first and second complementary surfaces 342, 344 may be tubular and concentric by being formed on an external surface of a first substantially cylindrical component 352 and an internal surface of a second substantially toroidal component 354 respectively. The first substantially cylindrical component 352 and second substantially toroidal component 354 may share a common axis 310. In order to maintain a consistent defined clearance between the first and second complementary surfaces 342, 344 while they move relative to each other, especially in the presence of abrasive particulate matter, it may be desirable to form the first and second complementary surfaces 342, 344 out of super-hard heat-resistant materials such as polycrystalline diamond. It may also be desirable to provide the first and second complementary surfaces 342, 344 with machined finishes. Such materials and processing may allow for the defined clearance between the first and second complementary surfaces 342, 344 to be less than 0.003 inches (0.0762 mm).

Figure 4:
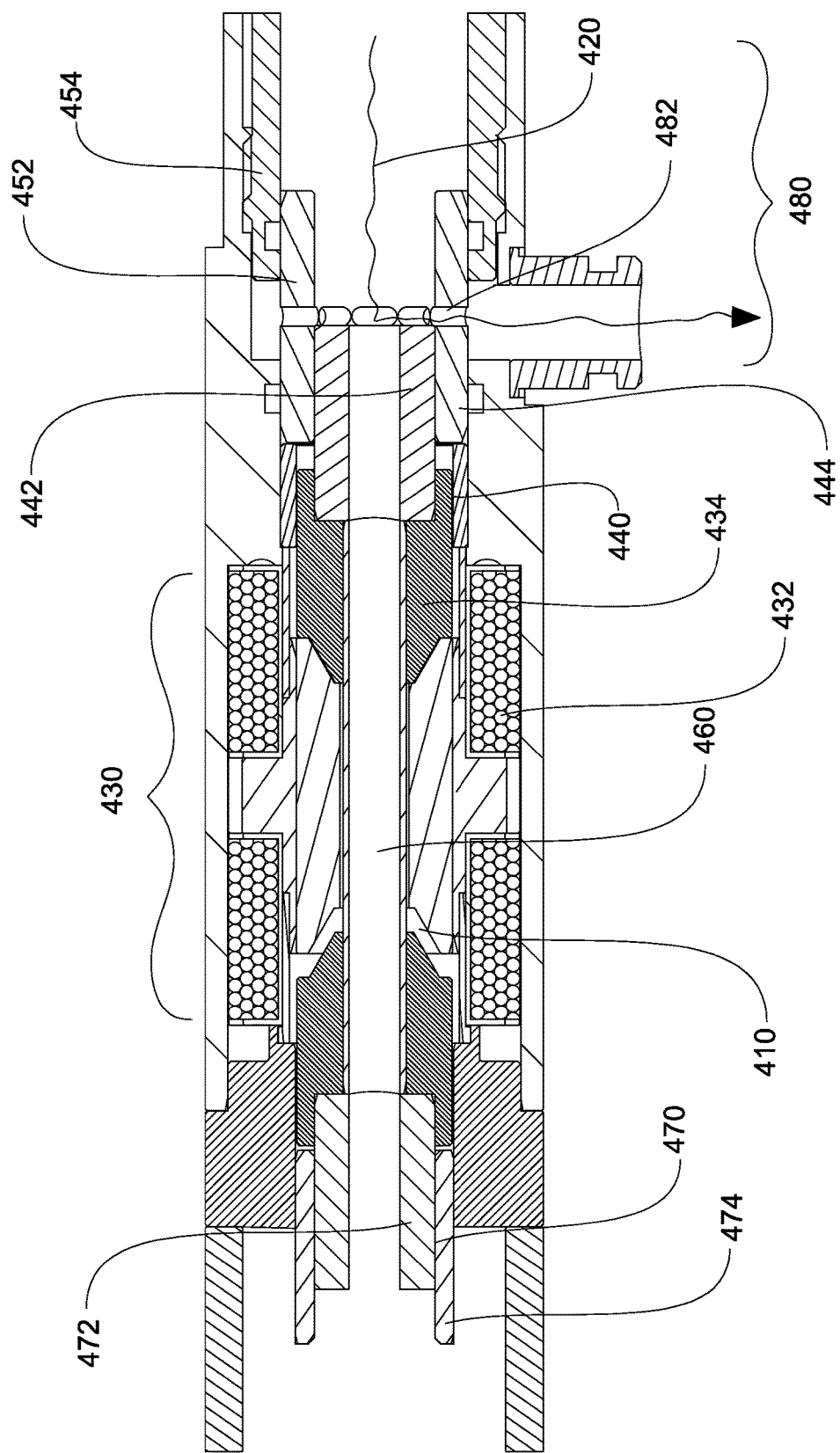
FIG. 4 is a longitudinal section view of another embodiment of a cavity disposed adjacent a fluid flow.

While in some embodiments of the present invention a first substantially cylindrical component is axially rotatable relative to a second substantially toroidal component, other embodiments comprise relative axially translation. For example, FIG. 4 shows an embodiment of a cavity 410 disposed adjacent a fluid flow 420. The cavity 410 comprises a solenoid switch 430 disposed therein. A defined clearance 440 between first and second complementary surfaces 442, 444 may allow for fluid communication between the fluid flow 420 and the cavity 410 permitting fluid to enter the cavity 410 while blocking potentially harmful particulate.

In the embodiment shown, the solenoid switch 430 comprises a helical winding 432 rigidly connected to the first complementary surface 442 and an armature 434 rigidly connected to the second complementary surface 444. However, in other embodiments this may be reversed. The first and second complementary surfaces 442, 444 may be tubular and concentric by being formed on an external surface of a first substantially cylindrical component 452 and an internal surface of a second substantially toroidal component 454 respectively. A conduit 460 may be disposed in the first substantially cylindrical component 452 allowing at least a portion of the fluid flow to pass there through. This may allow the solenoid switch 430 to be pressure balanced. Further, a second defined clearance 470 may be disposed between a second set of complementary surfaces 472, 474 allowing for fluid communication between the cavity 410 and the fluid flow 420 while blocking certain particulate matter within the fluid flow 420 from entering the cavity.

The solenoid switch 430 may be used to actuate a valve 480. The valve 480 may comprise at least one perforation 482 disposed in the second substantially toroidal component 454. The perforation 482 may be repetitively sealable by translation of the first substantially cylindrical component 452.

Figure 5B:
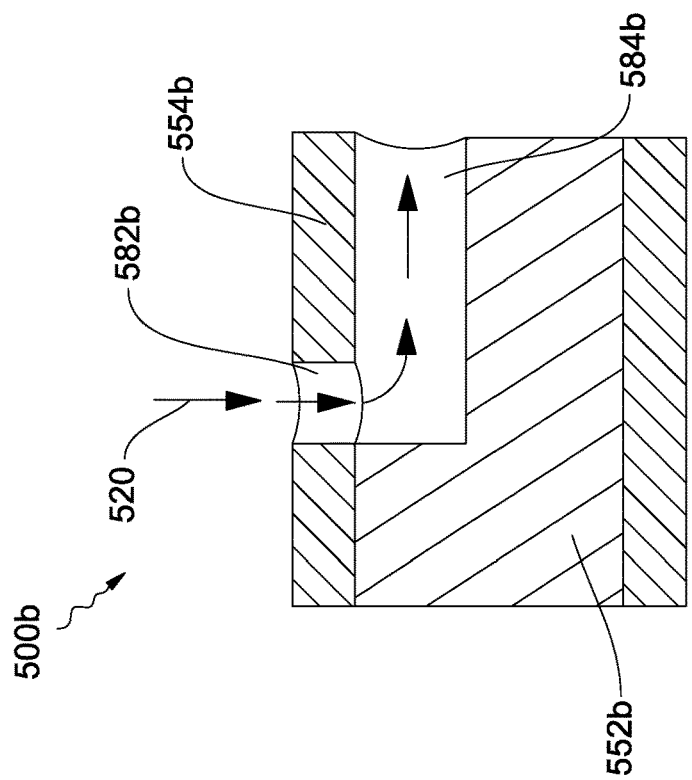
FIGS. 5a and 5b are perspective and longitudinal section views respectively of an embodiment of a first substantially cylindrical component and a second substantially toroidal component forming an axially rotatable valve.
Figure 5A:
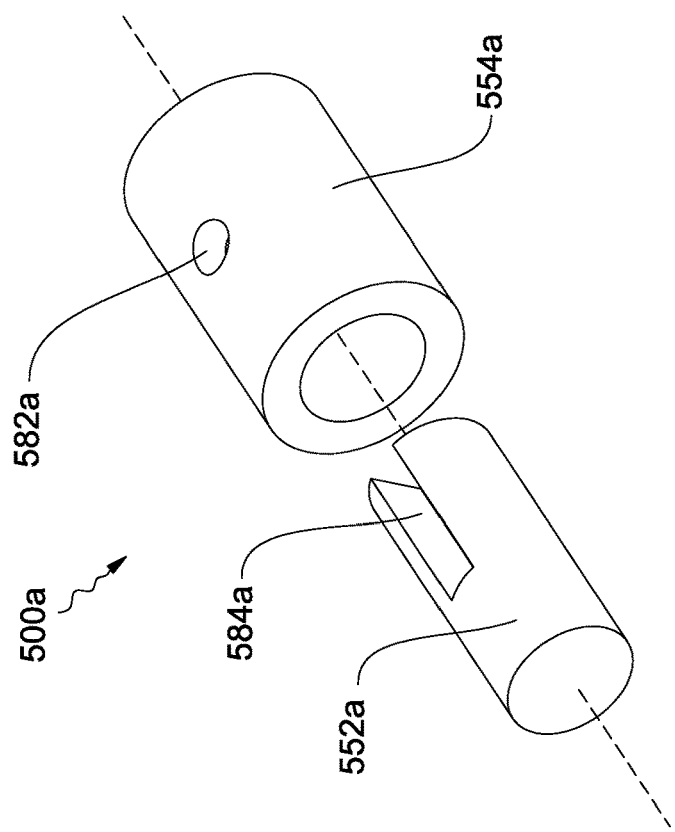

Other embodiments may comprise a rotary valve. For example, FIGS. 5a and 5b disclose a first substantially cylindrical component 552a, 552b and a second substantially toroidal component 554a, 554b that may fit together to form a rotary valve 500a, 500b. In this arrangement, at least one perforation 582a, 582b may be disposed in the second substantially toroidal component 554a, 554b and be repetitively sealable by rotation of the first substantially cylindrical component 552a, 552b. The first substantially cylindrical component 552a, 552b may further comprise a conduit 584a, 584b to allow at least part of a fluid flow 520 to the at least one perforation 582a, 582b when unsealed.

FIGS. 6a and 6b show an embodiment of how first and second complementary surfaces 642a, 642b and 644a, 644b may be planar and adjacent by being formed on an external surfaces of a first substantially cylindrical component 652a, 652b and a second substantially toroidal component 654a, 654b respectively. The first substantially cylindrical component 652a, 652b may move relative the second substantially toroidal component 654a, 654b while allowing fluid to pass there between. A defined clearance 640 may block certain particulate matter from passing between or crush other particulate matter while passing.

Whereas the present invention has been described in particular relation to the drawings attached hereto, it should be understood that other and further modifications apart from those shown or suggested herein, may be made within the scope and spirit of the present invention.

What is claimed is:

1. A tightly-closing dynamic assembly comprising:
   a motor or generator disposed within a cavity of an outer housing
   the motor or generator having
   a stator rigidly connected to either a first cylindrical component or second toroidal component; and
   a rotor rigidly connected to the first cylindrical component or second toroidal component not connected to the stator
   a cavity adjacent a fluid flow; and a defined clearance between two complementary surfaces allowing for fluid communication between the cavity and the fluid flow while blocking certain particulate matter within the fluid flow from entering the cavity; wherein the two complementary surfaces are movable relative to each other,
   wherein the two complementary surfaces are formed of super-hard heat-resistant materials,
   wherein movement of the two complementary surfaces relative to each other crushes particulate matter within the defined clearance.

2. The dynamic seal assembly of claim 1, wherein the two complementary surfaces are formed of polycrystalline diamond.

3. The dynamic seal assembly of claim 1, wherein the two complementary surfaces comprise machined finishes.

4. The dynamic seal assembly of claim 1, wherein the two complementary surfaces are each tubular and concentric.

5. The dynamic seal assembly of claim 4, wherein the two complementary surfaces comprise an external surface of a first cylindrical component and an internal surface of a second toroidal component.

6. The dynamic seal assembly of claim 5, wherein the first cylindrical component is axially rotatable relative to the second toroidal component.

7. The dynamic seal assembly of claim 6, further comprising a rotatable turbine disposed within the fluid flow and rigidly connected to either the first cylindrical component or second toroidal component.

8. The dynamic seal assembly of claim 5, wherein the first cylindrical component is axially translatable relative to the second toroidal component.

9. The dynamic seal assembly of claim 8, further comprising a solenoid switch disposed within the cavity comprising: a helical winding rigidly connected to either the first cylindrical component or second toroidal component; and an armature rigidly connected to the first cylindrical component or second toroidal component not connected to the helical winding.

10. The dynamic seal assembly of claim 8, further comprising at least one perforation in the second toroidal component repetitively sealable by translation of the first cylindrical component.

11. The dynamic seal assembly of claim 1, wherein the defined clearance between the two complementary surfaces is less than 0.003 inches (0.0762 mm ).

12. The dynamic seal assembly of claim 1, further comprising a second defined clearance between a second set of complementary surfaces allowing for fluid communication between the cavity and the fluid flow while blocking certain particulate matter within the fluid flow from entering the cavity.

13. The dynamic seal assembly of claim 1, wherein the cavity is formed in a downhole drill pipe and the fluid flow comprises drilling fluid passing the cavity.

14. The dynamic seal assembly of claim 13, wherein the defined clearance between the two complementary surfaces allows water from the drilling fluid to enter the cavity while blocking mud from the drilling fluid from entering the cavity.

* * * * *